(12) United States Patent
Bian et al.

(10) Patent No.: US 11,656,409 B2
(45) Date of Patent: May 23, 2023

(54) OPTICAL ANTENNA FOR PHOTONIC INTEGRATED CIRCUIT AND METHODS TO FORM SAME

(71) Applicant: GLOBALFOUNDRIES U.S. Inc., Santa Clara, CA (US)

(72) Inventors: Yusheng Bian, Ballston Lake, NY (US); Qizhi Liu, Lexington, MA (US)

(73) Assignee: GlobalFoundries U.S. Inc., Malta, NY (US)

(*) Notice: Subject to any disclaimer, the term of this patent is extended or adjusted under 35 U.S.C. 154(b) by 79 days.

(21) Appl. No.: 17/197,133

(22) Filed: Mar. 10, 2021

(65) Prior Publication Data

US 2022/0291446 A1     Sep. 15, 2022

(51) Int. Cl.
*G02B 6/124*     (2006.01)
*G02B 6/13*      (2006.01)

(52) U.S. Cl.
CPC .............. *G02B 6/124* (2013.01); *G02B 6/13* (2013.01)

(58) Field of Classification Search
CPC ............. G02B 6/12; G02B 6/124; G02B 6/13
See application file for complete search history.

(56) References Cited

U.S. PATENT DOCUMENTS

| | | | |
|---|---|---|---|
| 7,304,781 B2 | 12/2007 | Chang-Hasnain et al. | |
| 7,321,713 B2 | 1/2008 | Akiyama et al. | |
| 7,936,448 B2 | 5/2011 | Albuquerque et al. | |
| 8,422,841 B1* | 4/2013 | Shi | G02B 6/124 385/37 |
| 8,670,476 B2 | 3/2014 | Goddard et al. | |
| 8,988,754 B2 | 3/2015 | Sun et al. | |
| 9,057,844 B2 | 6/2015 | Doany et al. | |
| 9,612,411 B2* | 4/2017 | Hatori | G02B 6/124 |
| 10,585,245 B1 | 3/2020 | Bian et al. | |
| 2011/0049735 A1 | 3/2011 | Sakuma et al. | |
| 2015/0117817 A1 | 4/2015 | Chen et al. | |
| 2015/0346340 A1 | 12/2015 | Yaacobi et al. | |
| 2018/0088275 A1* | 3/2018 | Okayama | G02B 6/12007 |
| 2018/0267237 A1* | 9/2018 | Oonawa | G02B 6/12004 |
| 2019/0094467 A1* | 3/2019 | Hassan | G02B 6/305 |
| 2019/0352767 A1 | 11/2019 | Yu et al. | |
| 2020/0006606 A1 | 1/2020 | Shipton et al. | |
| 2020/0218012 A1 | 7/2020 | Wang et al. | |
| 2020/0341200 A1* | 10/2020 | Van Vaerenbergh | G02B 6/124 |
| 2022/0404547 A1* | 12/2022 | Bian | G01S 17/00 |

FOREIGN PATENT DOCUMENTS

| | | | |
|---|---|---|---|
| EP | 2703858 A1 | 5/2014 | |
| WO | 2013037900 A1 | 3/2013 | |

OTHER PUBLICATIONS

U.S. Appl. No. 17/354,408, Office Action dated Aug. 18, 2022, 14 pages.

(Continued)

*Primary Examiner* — Tina M Wong
(74) *Attorney, Agent, or Firm* — Anthony Canale; Hoffman Warnick LLC (57) ABSTRACT

Embodiments of the disclosure provide an optical antenna for a photonic integrated circuit (PIC). The optical antenna includes a semiconductor waveguide on a semiconductor layer. The semiconductor waveguide includes a first vertical sidewall over the semiconductor layer over the semiconductor layer. A plurality of grating protrusions extends horizontally from the first vertical sidewall of the semiconductor waveguide.

20 Claims, 10 Drawing Sheets

(56) References Cited

OTHER PUBLICATIONS

"Multiple-Layer Arrangements Providing Switchable Optical Components," Application filed Nov. 26, 2018 with the United States Patent and Trademark Office, KMLT278, 20 pages.
Pita et al., "Design of a compact CMOS-compatible photonic antenna by topological optimization," Optics Express 2435, vol. 26, No. 3, Feb. 5, 2018, 8 pages.
Sun et al., "Large-scale nanophotonic phased array," Nature, Research Letter, vol. 493, Jan. 10, 2013, pp. 195-199.
Rakowski et al., "45nm CMOS—Silicon Photonics Monolithic Technology (45CLO) for next-generation, low power and high speed optical interconnects," IEEE, OFC 2020, 3 pages.
Giewont et al., "300-mm Monolithic Silicon Photonics Foundry Technology," IEEE Journal of Selected Topics in Quantum Electronics, vol. 25, No. 5, Sep./Oct. 2019, 12 pages.
Bian et al., "Towards low-loss monolithic silicon and nitride photonic building blocks in state-of-the-art 300mm CMOS foundry," Frontiers in Optics / Laser Science, OSA 2020, 2 pages.
Zhang et al., "Sub-wavelength Spacing Optical Phase Array Nanoantenna Emitter with Vertical Silicon Photonic Vias," OFC 2018, downloaded on Jan. 6, 2021, 3 pages.
U.S. Appl. No. 17/354,408, Notice of Allowance dated Nov. 7, 2022, 7 pages.
Bian et al., "Light manipulation in a monolithic silicon photonics platform leveraging 3D coupling and decoupling," Frontiers in Optics, Laser Science, OSA 2020, 2 pages.
Bian et al., "Monolithically integrated silicon nitride platform," OFC 2021, 3 pages.

\* cited by examiner

OPTICAL ANTENNA FOR PHOTONIC INTEGRATED CIRCUIT AND METHODS TO FORM SAME

TECHNICAL FIELD

The subject matter disclosed herein relates to the transmission of optical signals in a photonic integrated circuit (PIC). More specifically, the disclosure relates to an optical antenna for a PIC, and related methods to form the same.

BACKGROUND

The rise of networking devices, such as the "Internet of Things" (IoT), with links to a data center has accompanied a larger number of signal-processing elements in semiconductor wafers. Semiconductor chips may be modified, adapted, etc., to house the various components needed to transmit light from one component to another. Semiconductor chips which include photonic devices and microcircuitry are known as "photonic integrated circuits" (PICs). PIC dies typically include optical components on the surface or at the edge of a PIC die to transmit light into and from the optical devices therein, such as waveguides and grating couplers. The various optical components, e.g., photonic waveguides, photonic transmitters and receivers, etc., can relay signals through light transmission.

A technical challenge associated with PIC technology is possible signal loss through the use of oriented optical grating couplers. Optical grating couplers, or other structures for directing optical signals, are typically deployed in silicon photonic chips to connect two displaced photonic waveguides. Conventional grating couplers or other structures may exhibit a limited range of emission angles, and thus have a restricted field of view. In some technical applications, such as light detection and ranging or "LiDAR," conventional grating couplers or other structure for light transmission have not provided sufficient field of view, and thus signal fidelity, for all operations.

SUMMARY

Aspects of the present disclosure provide an optical antenna for a photonic integrated circuit (PIC), the optical antenna including: a semiconductor waveguide on a semiconductor layer, the semiconductor waveguide including a first vertical sidewall over the semiconductor layer over the semiconductor layer; and a first plurality of grating protrusions extending horizontally from the first vertical sidewall of the semiconductor waveguide.

Further aspects of the present disclosure provide an optical antenna for a photonic integrated circuit (PIC), the optical antenna including: a semiconductor waveguide on a semiconductor layer, the semiconductor waveguide including a first vertical sidewall over the semiconductor layer and a second vertical sidewall over the semiconductor layer, opposite the first vertical sidewall; a first plurality of grating protrusions extending horizontally from the first vertical sidewall of the semiconductor waveguide; a second plurality of grating protrusions extending horizontally from the second vertical sidewall of the semiconductor waveguide; a dielectric layer horizontally adjacent the semiconductor waveguide, wherein portions of the dielectric layer interdigitate with the first plurality of grating protrusions and the second plurality of grating protrusions; and a nitride waveguide over an upper surface of the semiconductor waveguide and an upper surface of the dielectric layer.

Yet another aspect of the present disclosure provides a method of forming an optical antenna, the method including: forming a semiconductor waveguide over a semiconductor layer; and forming a first plurality of grating protrusions on a first vertical sidewall of the semiconductor waveguide.

BRIEF DESCRIPTION OF THE DRAWINGS

These and other features of this disclosure will be more readily understood from the following detailed description of the various aspects of the disclosure taken in conjunction with the accompanying drawings that depict various embodiments of the disclosure, in which.

It is noted that the drawings of the disclosure are not necessarily to scale. The drawings are intended to depict only typical aspects of the disclosure, and therefore should not be considered as limiting the scope of the disclosure. In the drawings, like numbering represents like elements between the drawings.

DETAILED DESCRIPTION

In the following description, reference is made to the accompanying drawings that form a part thereof, and in which is shown by way of illustration specific illustrative embodiments in which the present teachings may be practiced. These embodiments are described in sufficient detail to enable those skilled in the art to practice the present teachings, and it is to be understood that other embodiments may be used and that changes may be made without departing from the scope of the present teachings. The following description is, therefore, merely illustrative.

The present disclosure provides an optical antenna for an integrated circuit (PIC) die. Optical antennae according to the disclosure are operable to vertically transmit optical signals over a wider range of transmission angles than has previously been achieved. Optical antennae according to the disclosure may include a semiconductor waveguide on a semiconductor layer. The semiconductor waveguide includes two opposing sidewalls, each over the semiconductor layer. The semiconductor waveguide includes a pluralities of grating protrusion, each extending horizontally outward from one of the two vertical sidewalls. These grating protrusions allow for transmission of optical signals at a non-vertical angle with respect to the plane of the semiconductor layer and/or an input waveguide to the optical antenna. A nitride cap, which may be part of a nitride waveguide, is on an upper surface of the semiconductor waveguide. The plurality of grating protrusions may expand the angular range for possible transmission of optical signals.

Figure 1:
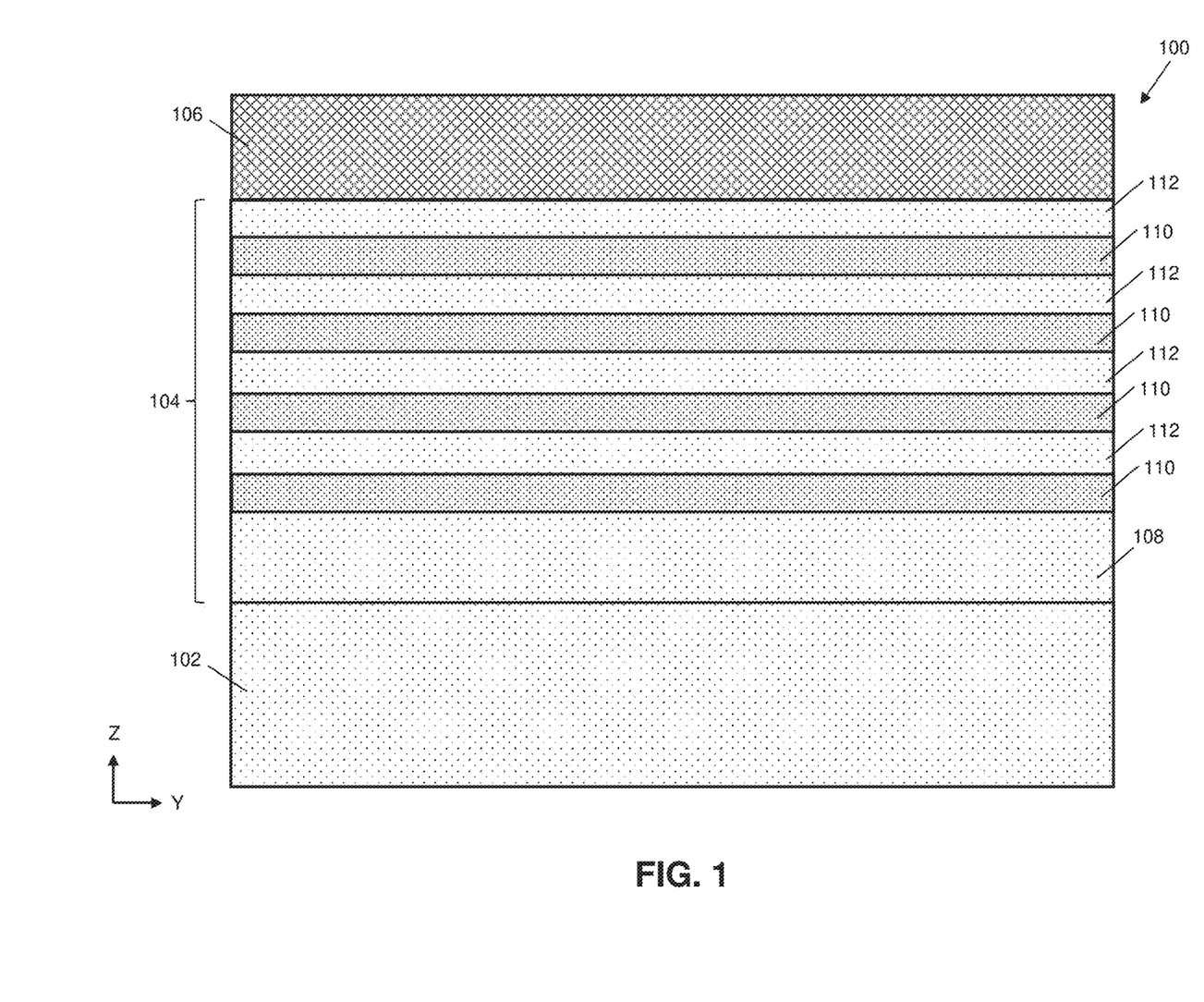
FIG. 1 shows a cross-sectional view of an initial structure to form an optical antenna according to embodiments of the disclosure.

Referring initially to FIG. 1, embodiments of the disclosure provide a method to form an optical antenna for a PIC die. An initial structure 100 to be processed according to the disclosure may include materials that are also used to form portions of a device layer, e.g., several transistors, in a complementary metal oxide semiconductor (CMOS) region elsewhere on the same device. Initial structure 100 may include a semiconductor layer 102 at least partially composed of any currently known or later developed semiconductor material, which may include without limitation: silicon, germanium, silicon germanium, and substances consisting essentially of one or more III-V compound semiconductors having a composition defined by the formula $Al_{X1}Ga_{X2}In_{X3}As_{Y1}P_{Y2}N_{Y3}Sb_{Y4}$, where X1, X2, X3, Y1, Y2, Y3, and Y4 represent relative proportions, each greater than or equal to zero and X1+X2+X3+Y1+Y2+Y3+Y4=1 (1 being the total relative mole quantity). Semiconductor layer 102 may be a portion of a semiconductor waveguide for transmitting optical signals to an optical antenna, as described elsewhere herein.

Initial structure 100 may include a stack of semiconductor layers ("semiconductor stack") 104 on semiconductor layer 102. Semiconductor stack 104 provides several layers of semiconductor material that may be processed into an optical antenna in methods according to the disclosure. Semiconductor stack 104 may include a base layer of semiconductor material ("base material") 108 formed on semiconductor layer 102. Base material 108 may have the same composition as semiconductor layer 102, and optionally may be structurally indistinct from semiconductor layer 102. In cases where initial structure 100 is formed on bulk silicon, base material 108 may be a portion of a bulk silicon layer. Base material 108 indicates portions of semiconductor material on which grating structures for an optical antenna can be formed. In an example implementation, base material 108 may have a thickness of at least approximately six hundred Angstroms (Å), or in the case of a bulk semiconductor layer, may be a top-most portion of semiconductor layer 102 having approximately the same thickness.

As shown in FIG. 1, semiconductor stack 104 in some cases may include a set of first semiconductor layers 110, vertically alternating with a set of second semiconductor layers 112. First and second sets of semiconductor layers 110, 112 may initially be formed as alternating layers of semiconductor material on base material 108, and individual layers within each set of semiconductor layers 110, 112 optionally may have substantially the same vertical thickness. Sets of semiconductor layers 110, 112 may be formed from any currently known or later developed semiconductor material, e.g., silicon in single crystal and/or polycrystalline form, silicon germanium (SiGe), etc. In further implementations, any of the various example semiconductor implementations discussed with respect to semiconductor layer 102 may be operable for use in each set of semiconductor layers 110, 112. First set of semiconductor layers 110, however, may be composed of a different material relative to second set of semiconductor layers 112. The number of layers in each set 110, 112 may vary depending on intended applications, and four distinct layers are illustrated in each set 110, 112 solely as an example.

The composition of each layer in semiconductor stack 104 may enable selective processing of first semiconductor layer 110 without affecting second semiconductor layer 112, or vice versa. According to an example, first set of semiconductor layers 110 may be highly doped with boron (B) or similar doping materials to enable selective etching and/or recessing relative to second set of semiconductor layers 112. In the case where sets of semiconductor layers 110, 112 have distinct dopant types and/or doping concentrations, first set of semiconductor layers 110 may have an approximately five percent (or other percentage) of boron doping, second set of semiconductor layers 112 may have substantially no boron doping, or vice versa. In further implementations, first semiconductor layer 110 may include crystalline silicon while second semiconductor layer 112 includes silicon germanium (SiGe), or vice versa. It is understood that sets of semiconductor layers 110, 112 may have other types of structural differences to enable selective processing (e.g., etching of one set of semiconductor layers without etching the other set of semiconductor layers). Each set of semiconductor layers 110, 112 may have a thickness of, e.g., approximately one hundred A or less, to provide the intended thickness of grating protrusions in subsequent processing.

Figure 6:
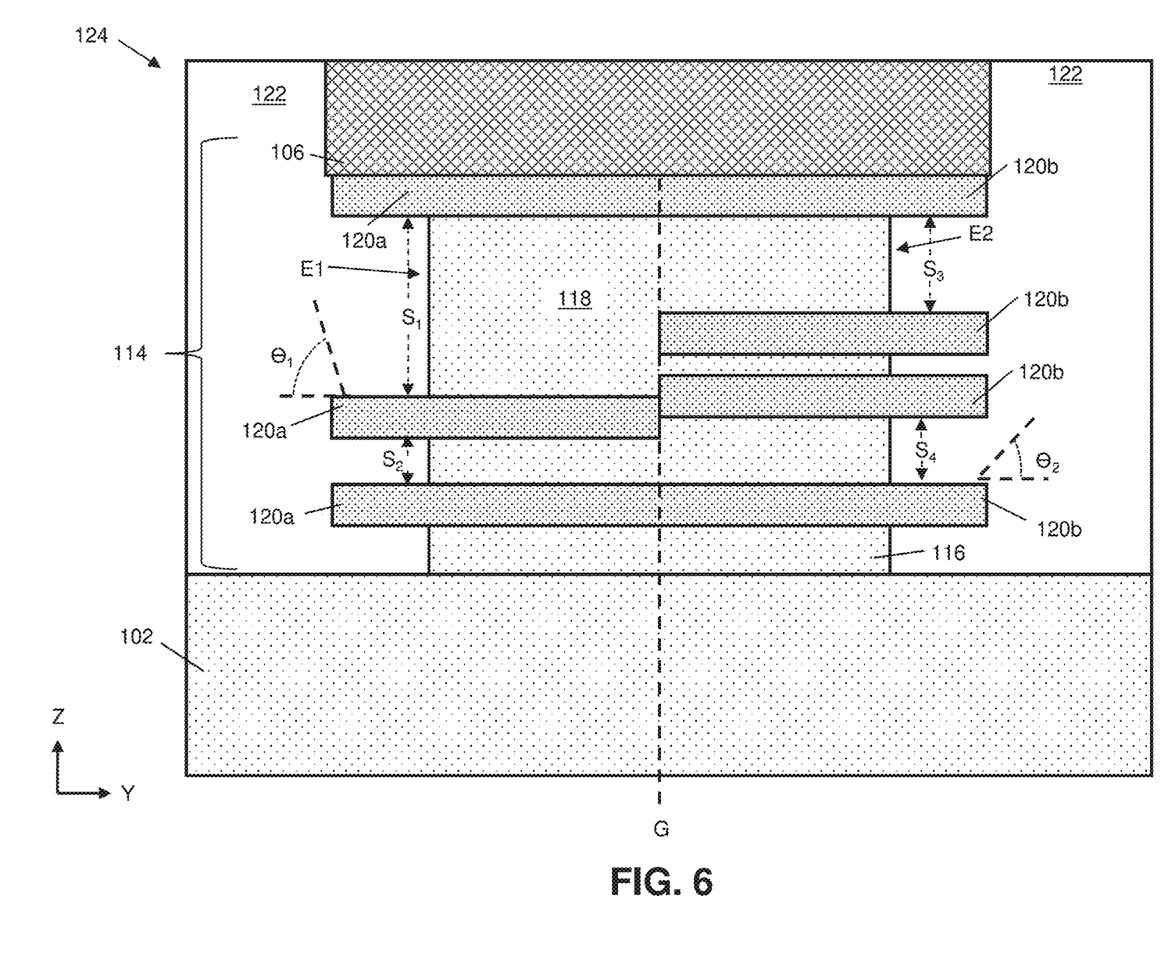
FIG. 6 shows a cross-sectional view of an optical antenna with grating protrusions of varying pitch according to embodiments of the disclosure.

Initial structure 100 may include a nitride cap 106 over semiconductor stack 104. As an example, nitride cap 106 is illustrated as being on the upper surface of second set of semiconductor layers 112, but nitride cap 106 alternatively may be on a layer of first set of semiconductor layers 110 or another portion of semiconductor stack 104 in further examples. Nitride cap 106 may be an inert structure included to protect semiconductor stack 104 during subsequent processing, and/or may form part of a nitride waveguide for transmitting optical signals to other portions of a device (e.g., as shown in FIG. 6 and discussed elsewhere herein). Nitride cap 106 thus may include silicon nitride (SiN) and/or other types of light transmitting materials. In this configuration, semiconductor stack 104 is vertically between semiconductor layer 102 and nitride cap 106, and may be processed to form a vertically extending, optically transmissive region therebetween.

Figure 2:
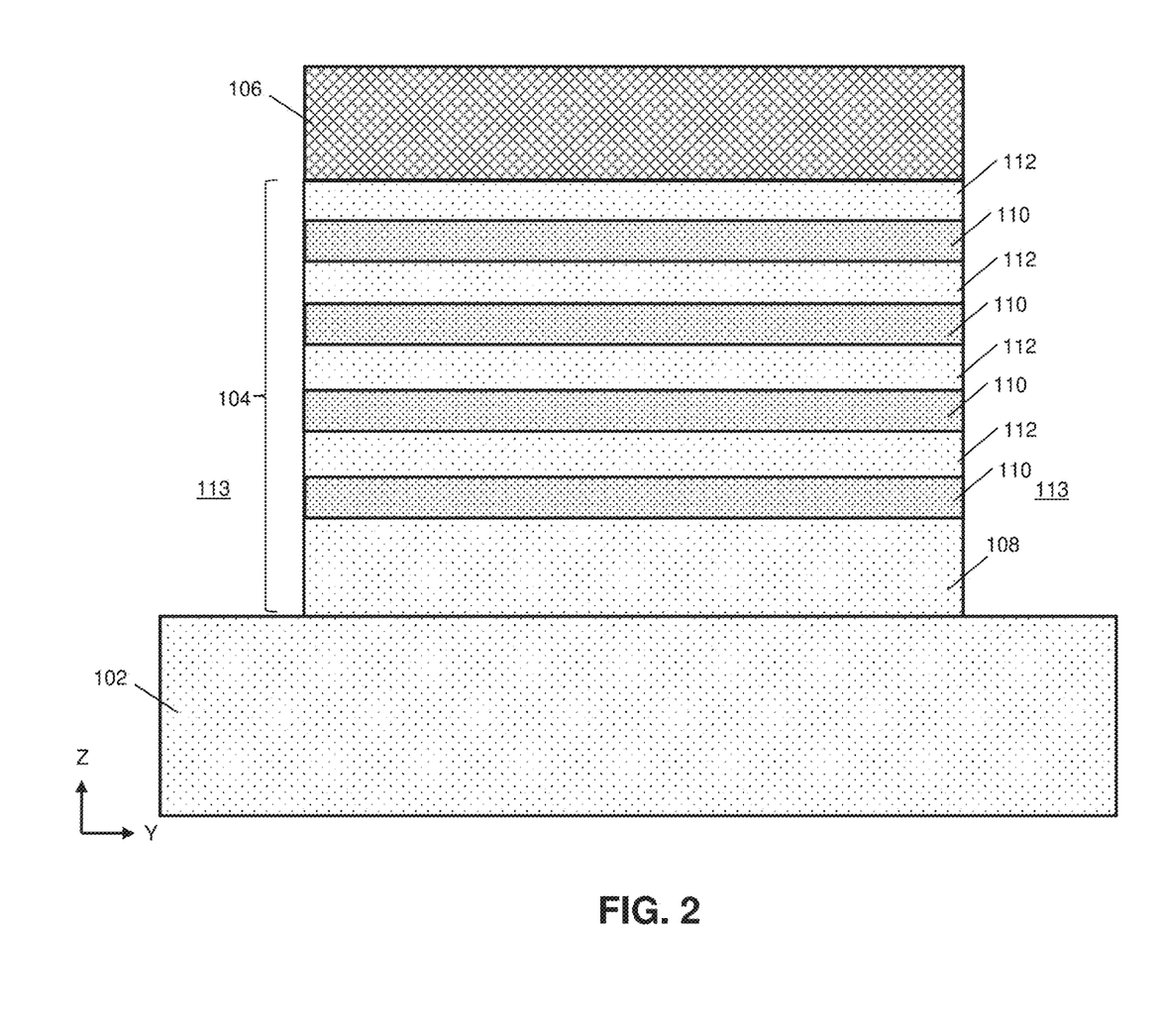
FIG. 2 shows a cross-sectional view of a process of forming openings for defining an optical antenna according to embodiments of the disclosure.

FIG. 2 depicts further processing of semiconductor stack 104 and nitride cap 106 in methods according to the disclosure. To begin forming a vertically-extending region from semiconductor stack 104, embodiments of the disclosure may include forming a set of openings 113 on opposite lateral ends of semiconductor stack 104. Various portions of semiconductor stack 104 may be removed by etching to form openings 113. Etching generally refers to the removal of material from an underlying layer, e.g., semiconductor stack 104 or others discussed herein, and is often performed with a mask (not shown) in place so that material may be selectively removed from certain areas, while leaving the material unaffected, in other areas. There are generally two categories of etching, (i) wet etch and (ii) dry etch. Wet etch is performed with a solvent (such as an acid) which may be chosen for its ability to selectively dissolve a given material (such as oxide), while, leaving another material (such as polysilicon) relatively intact. This ability to selectively etch given materials is fundamental to many semiconductor fabrication processes. A wet etch will generally etch a homogeneous material (e.g., oxide) isotropically, but a wet etch may also etch single-crystal materials (e.g. silicon wafers) anisotropically. Dry etch may be performed using a plasma. Plasma systems can operate in several modes by adjusting the parameters of the plasma. Ordinary plasma etching produces energetic free radicals, neutrally charged, that react at the surface of the wafer. Since neutral particles attack the wafer from all angles, this process is isotropic. Ion milling, or sputter etching, bombards the wafer with energetic ions of noble gases which approach the wafer approximately from one direction, and therefore this process is highly anisotropic. Reactive-ion etching (RIE) operates under conditions intermediate between sputter and plasma etching and may be used to produce deep, narrow features. After opening(s) 113 are formed, semiconductor stack 104 may have a lateral width that is less than semiconductor layer 102, e.g., based on the size of a mask used to form opening(s) 113. Opening(s) 113 may expose an upper surface of semiconductor layer 102, and may extend to approximately the depth of base material 108.

Figure 3:
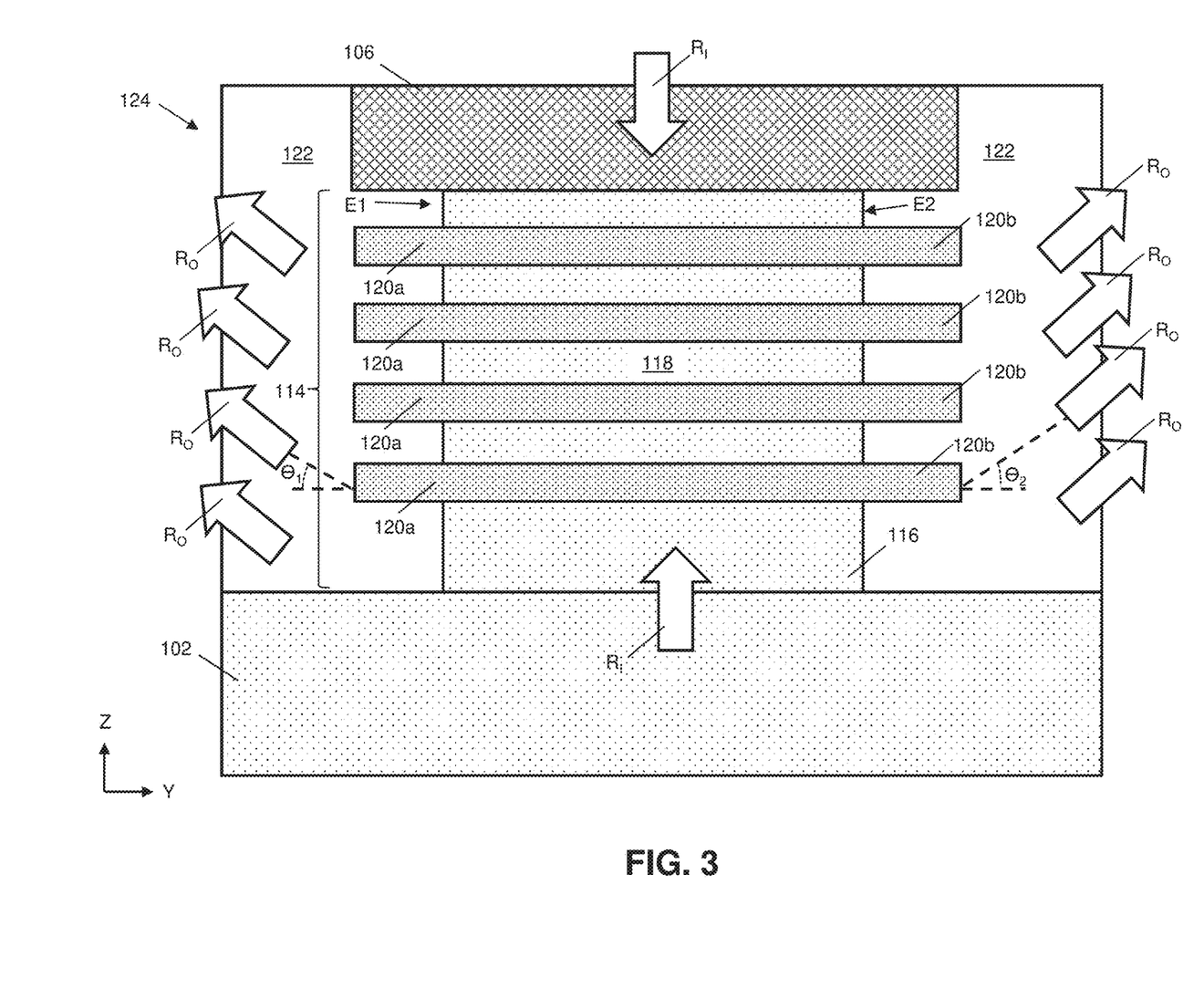
FIG. 3 shows a cross-sectional view of a process to form grating protrusions on sidewalls of an optical antenna according to embodiments of the disclosure.

Turning to FIG. 3, subsequent processing may convert semiconductor stack 104 (FIGS. 1, 2) into an optical antenna structure. For example, FIG. 3 depicts recessing of base material 108 (FIGS. 1, 2) and first set of semiconductor layers 110 (FIGS. 1, 2) to form a vertically oriented semiconductor waveguide ("semiconductor waveguide") 114. The recessing depicted in FIG. 3 may be implemented, e.g., by way of one or more etchants selective to the composition of second set of semiconductor layers 110 (FIGS. 1, 2). In alternative implementations, semiconductor waveguide 114 may be formed by repeated instances of deposition and etching. In some cases, portions of nitride cap 106 may be removed via the etching processes, while nitride cap 106 may be substantially unaffected in other implementations. Upon being formed, semiconductor waveguide 114 may include a first sidewall E1 at one horizontal end and a second sidewall E2 at its opposite horizontal end. Semiconductor waveguide 114 may include a base portion 116 on semiconductor layer 102, which extends vertically (e.g., upward along the Z-axis) from semiconductor layer 102 to a predetermined vertical thickness (e.g., approximately 600 Å) without horizontal protrusions from sidewalls E1, E2. An antenna portion 118 of optical antenna 124 may include a first plurality of grating protrusions 120a extending horizontally outward from first sidewall E1. Antenna portion 118 additionally or alternatively may include a second plurality of grating protrusions 120b extending horizontally outward from second sidewall E2. Grating protrusions 120a, 120b will divert light within semiconductor waveguide 114 to other structures at various angles, and are discussed in further detail herein. Although two pluralities of grating protrusions 120a, 120b are shown in the Y-Z plane as an example, it is possible to include only one plurality of grating protrusions 120a or 120b on antenna portion 118. Furthermore, additional pluralities of grating protrusions (not shown) may be formed on other sidewalls of semiconductor waveguide 114 (e.g., in plane X-Z) in further implementations.

After semiconductor waveguide 114 is formed, methods according to the disclosure may include forming a dielectric layer 122 (e.g., one or more oxide insulators) horizontally adjacent semiconductor waveguide 114, and vertically between adjacent grating protrusions 120a, 120b. Dielectric layer 122 may be composed of one or more oxide compounds, and/or any other currently known or later-developed electrically insulative substances. As examples, dielectric layer 122 may include materials such as: silicon nitride ($Si_3N_4$), silicon oxide ($SiO_2$), fluorinated $SiO_2$ (FSG), boro-phospho-silicate glass (BPSG), silsesquioxanes, carbon (C) doped oxides (i.e., organosilicates) that include atoms of silicon (Si), carbon (C), oxygen (O), and/or hydrogen (H), other low dielectric constant (<3.9) material, and/or layers thereof. In addition to providing electrical insulator, dielectric layer 122 may be substantially transparent to allow light to pass therethrough.

Embodiments of the disclosure provide an optical antenna 124 for a PIC structure, in which semiconductor waveguide 114 is positioned over semiconductor layer 102. As noted elsewhere herein, semiconductor waveguide 114 may include first vertical sidewall E1 and second vertical sidewall E2 on opposing horizontal ends of semiconductor waveguide 114. When optical antenna 124 is operating to send optical signals, input signals $R_I$ may enter semiconductor waveguide 114 from semiconductor layer 102 and/or nitride cap 106. The perpendicular junction between semiconductor waveguide 114 and adjacent optical media causes input signals $R_I$ to transition from propagating along a horizontal pathway to propagating along a vertical pathway. Embodiments of optical antenna provide two sets of grating protrusions 120a, 120b. Multiple sets of grating protrusions 120a, 120b divert input signals $R_I$ in several directions (e.g., leftward and rightward in plane Y-Z) as output signals $R_O$. Output signal(s) $R_O$ may be oriented within a range of angles θ relative to a reference axis (e.g., Y-axis in FIG. 3). The range of angles θ may depend on the size, position, and/or other properties of each set of grating protrusions 120a, 120b, and different angle $θ_1$, $θ_2$ may correspond to each set of grating protrusions 120a, 120b, respectively.

First and second pluralities of grating protrusions 120a, 120b may operate as diffraction gratings on sidewalls E1, E2 of optical antenna 124. A diffraction grating is an optical device with grating protrusions 120a, 120b in the form of discrete elements that split and diffract an optical signal, e.g., radiation, into several separate beams depending on wavelength. The "pitch" of each plurality of grating protrusions may denote the width of one grating protrusion plus the spacing between one grating protrusion and its adjacent grating protrusion in first and/or second plurality of grating protrusions 120a, 120b. The pitch of a plurality of diffraction gratings determines the wavelength of the optical signal that can pass therethrough. Upon leaving optical antenna 124, output signals $R_O$ may travel in various directions to external structures (e.g., a person or building), where may be partially absorbed and reflected back to other IC chips and/or products that are external to the device where optical antenna 124 is formed, or in the same IC chip as where optical antenna 124 is formed. The received reflected signal may be converted to an electrical signal by the IC chip. Such structures may be in other IC chips and/or products that are external to the device where optical antenna 124 is formed, or in the same IC chip as where optical antenna 124 is formed. As noted herein, pluralities of grating protrusions 120a, 120b may include any material included within first or second set of semiconductor layer(s) 110, 112 (FIGS. 1, 2). Such materials may include but are not limited to: germanium (Ge), silicon (Si), or silicon germanium (SiGe). FIG. 3 depicts an example in which first and second pluralities of grating protrusions 120a, 120b have substantially identical positions and pitch on sidewalls E1, E2 of semiconductor waveguide 114. However, various embodiments of the disclosure may include pluralities of grating protrusions 120a, 120b with alternative positions, pitches, etc., to produce variations in how optical antenna 124 will direct optical signals.

Figure 4:
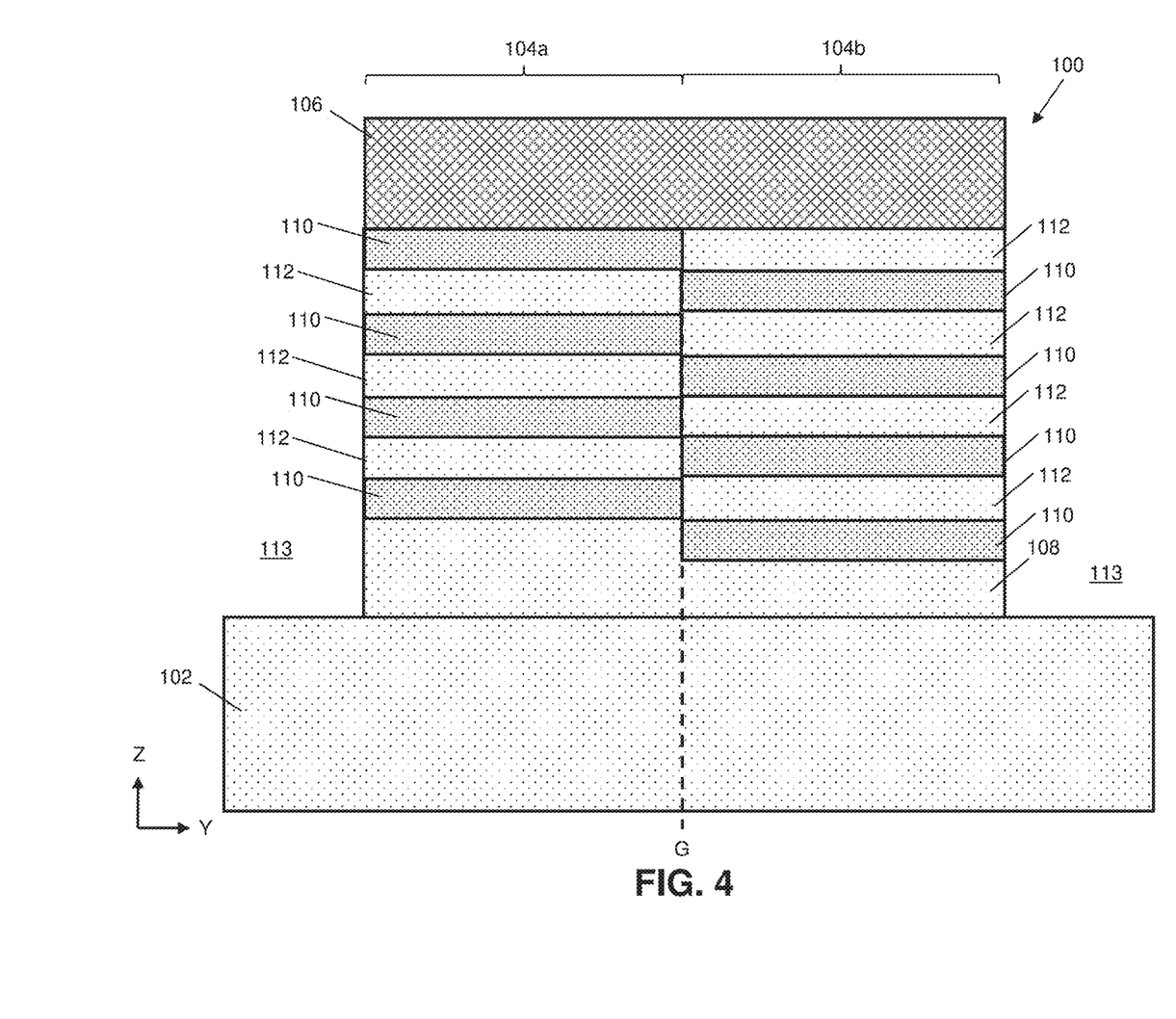
FIG. 4 shows a cross-sectional view of a semiconductor stack according to further embodiments of the disclosure.

FIG. 4 depicts a further configuration of initial structure 100, in which two semiconductor stacks 104 (separately labeled as 104a, 104b, respectively) are formed on semiconductor layer 102. Semiconductor stacks 104a, 104b may be two distinct structures, and/or may include two portions of the same initial semiconductor material with distinct layering and/or doping. In an example configuration, first semiconductor layers 110 of semiconductor stack 104a may horizontally abut second semiconductor layers 112 of semiconductor stack 104b and vice versa.

Figure 5:
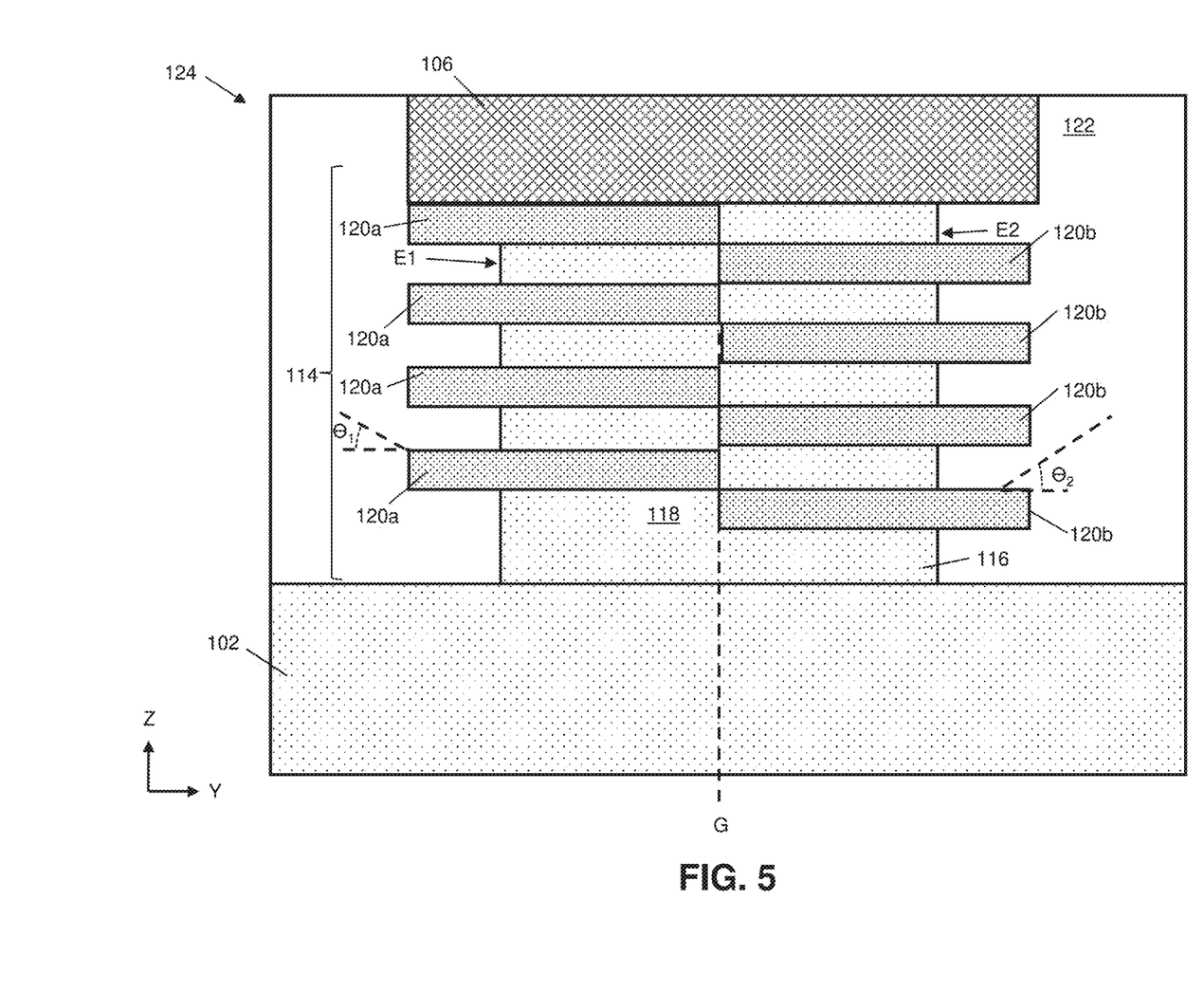
FIG. 5 shows a cross-sectional view of an optical antenna with asymmetric grating protrusions according to embodiments of the disclosure.

FIG. 5 depicts a configuration of optical antenna 124 formed from, e.g., semiconductor stacks 104a, 104b (FIG. 4) as discussed elsewhere herein. The use of semiconductor stacks 104a, 104b, or selective processing of one semiconductor stack at different locations, may yield optical antenna 124 with structural differences between first plurality of grating protrusions 120a and second plurality of grating protrusions 120b. Such structural differences may affect the range of angles $\theta_1$, $\theta_2$, for output signals $R_O$ (FIG. 3). In this case, first plurality of grating protrusions 120a and second plurality of grating protrusions 120b may be arranged asymmetrically with respect to a centerline axis G (extending, e.g., along the Z-axis) of semiconductor waveguide 114. Thus, one or more of first plurality of grating protrusions 120a may not be horizontally aligned with a protrusion in second plurality of grating protrusions 120b. Although pluralities of grating protrusions 120a, 120b may not be symmetric about centerline axis G in such an arrangement, each plurality of grating protrusions 120a, 120b may have a substantially equidistant spacing (e.g., a uniform pitch) within each adjacent grating protrusion. This may affect the range of angles for diffracted light in each plurality of grating protrusion, without affecting the wavelengths of absorbed and/or diffracted optical signals. Pluralities of grating protrusions 120a, 120b may be arranged asymmetrically about centerline axis G, e.g., through the use of semiconductor stacks 104a, 104b as described herein. In further examples, pluralities of grating protrusions 120a, 120b may be asymmetric about centerline axis G by a modified combination of deposition and etching procedures to change the location where each plurality of grating protrusions 120a, 120b are formed from semiconductor stack(s) 104.

FIG. 6 depicts another implementation of optical antenna 124, in which first and second pluralities of grating protrusions 120a, 120b are arranged asymmetrically about centerline axis G, and are spaced to have different pitches on each sidewall E1, E2 of semiconductor waveguide 114. To further vary the angles of refraction from semiconductor waveguide 114, and/or to absorb selected wavelengths of light, each plurality of grating protrusions 120a, 120b may have varying pitches between adjacent protrusions. First plurality of grating protrusions may have a substantially non-equidistant spacing, e.g., at least one spacing $S_1$ between two adjacent protrusions may be different from another spacing $S_2$ between another pair of adjacent protrusions in first plurality of grating protrusions 120a. Second plurality of grating protrusions 120b additionally or alternatively may also include different amounts of spacing $S_3$, $S_4$ between adjacent grating protrusions, and/or may have a different number of grating protrusions therein. First plurality of grating protrusions 120a and second plurality of grating protrusions 120b may be processed differently from each other, e.g., by further modifying the size and spacing of layers in semiconductor stacks 104a, 104b. In still further examples, the pitch in each plurality of grating protrusions 120a, 120b may be modified to produce varied spacings $S_1$, $S_2$, $S_3$, $S_4$ by modifying the masks and/or etching of each plurality of grating protrusions 120a, 120b, and/or other currently known or later developed processes for selectively removing material(s). In some cases, first and second pluralities of grating protrusions 120a, 120b may have protrusions of different vertical thickness to further vary the pitch in each plurality 120a, 120b.

Figure 7:
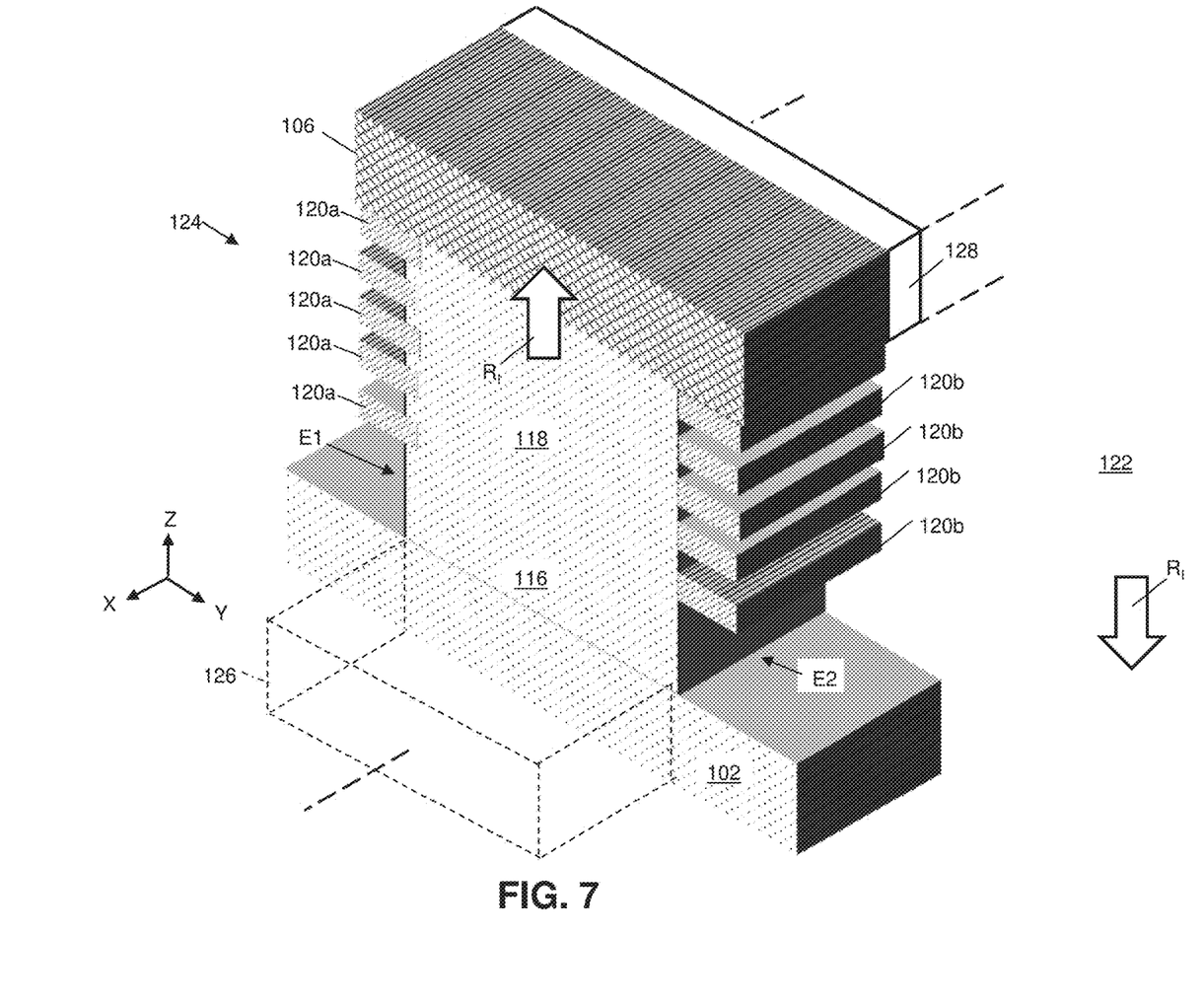
FIG. 7 shows a perspective view of an optical antenna with a silicon waveguide and nitride waveguide according to embodiments of the disclosure.

FIG. 7 depicts a perspective view of optical antenna 124, in which multiple input waveguides provide optical signals to be deflected with first and second pluralities of grating protrusions 120a, 120b. For example, portions of semiconductor layer 102 may include an input waveguide 126 (shown with dashed lines) that is capable of transmitting optical signals into optical antenna 124, e.g., along the direction of the X-axis. Nitride cap 106 may include, or otherwise may be coupled to, a nitride waveguide 128. Nitride waveguide 128 may be positioned above optical antenna 124 and portions of dielectric layer 122, and may be horizontally coupled to nitride cap 106 and/or otherwise coupled to an upper portion of optical antenna 124. Each waveguide 126, 128 may transmit signals into optical antenna 124 for deflection via each plurality of grating protrusions 120a, 120b.

Waveguide(s) 126, 128 may be formed as any suitable optical element or structure that is configured to transmit and/or receive optical signals. In a non-limiting example, waveguide(s) 126, 128 may include a core layer (not shown) formed from crystalline silicon, silicon nitride, and/or or other similar materials. Input waveguide 126 in particular may include a silicon, silica, or silica doped material. In still further examples, waveguide(s) 126, 128 may include multicore fibers for optical coupling to optical antenna 124, gain media, other waveguides, and/or other components. In other non-limiting examples (not shown) waveguide(s) 126, 128 may also include a cladding layer and/or insulating jacket surrounding its core layer. In other non-limiting examples, waveguide(s) 126, 128 may be formed as and/or may be coupled to one or more fluoride fibers, chalcogenide fibers, and/or plastic fibers. However embodied, waveguide(s) 126, 128 may extend transversely from optical antenna 124 along the X-axis or any other predetermined direction.

Figure 8:
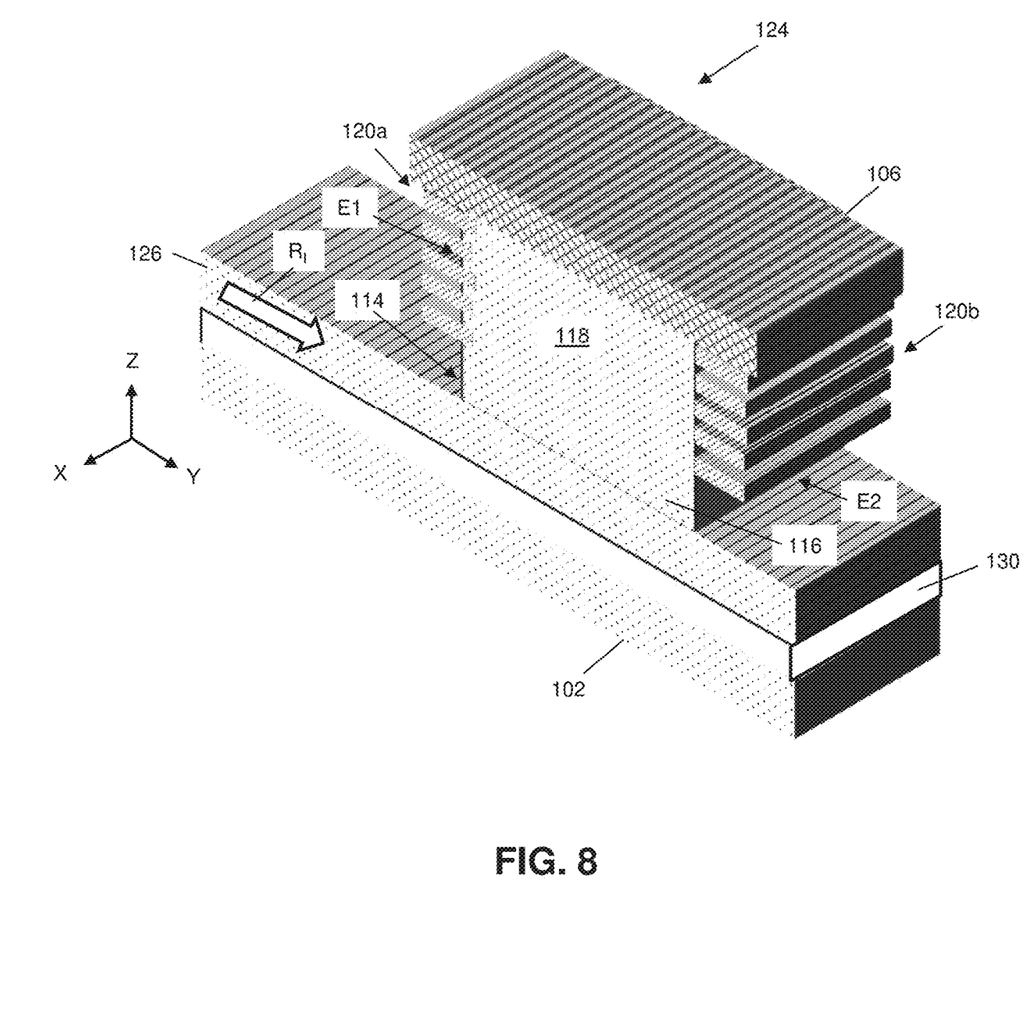
FIG. 8 shows a perspective view of an optical antenna with a laterally oriented silicon waveguide according to embodiments of the disclosure.
Figure 9:
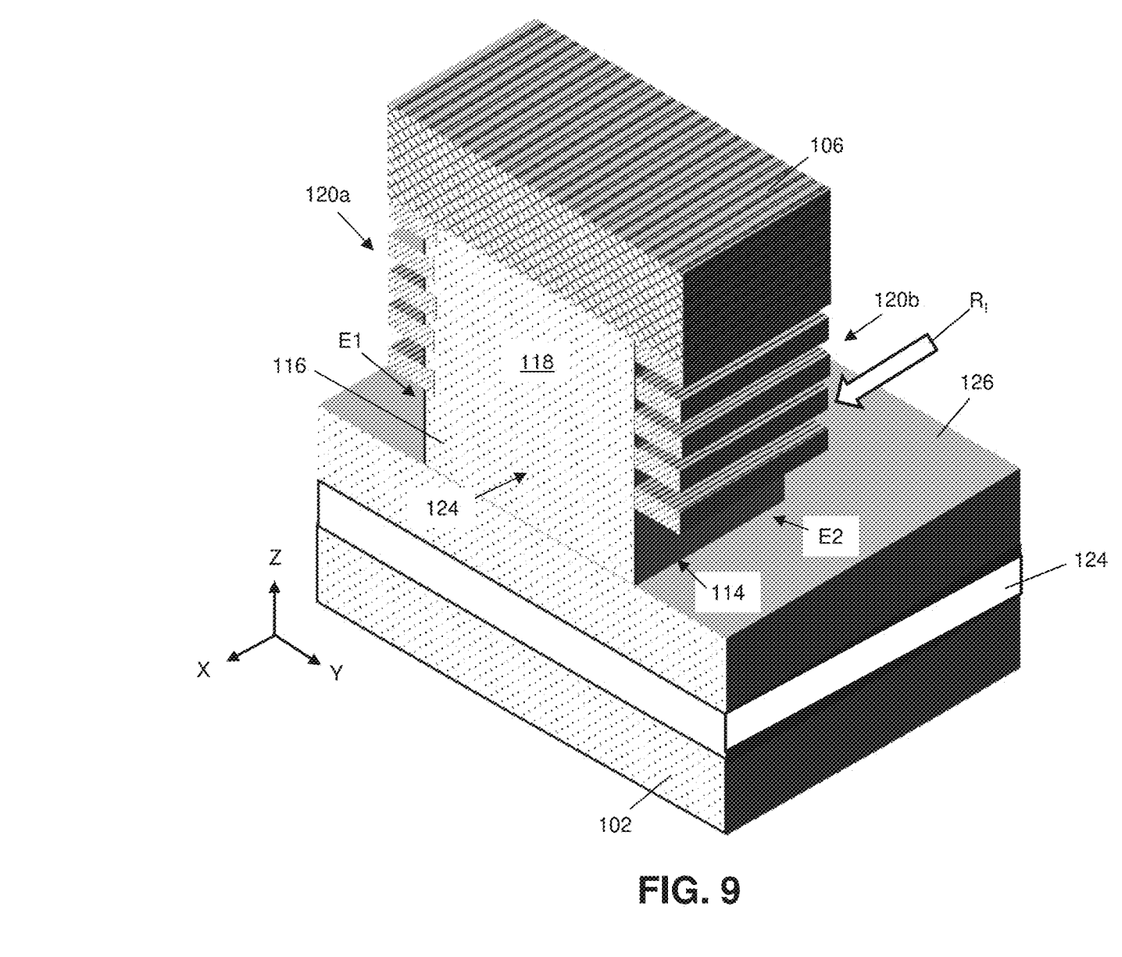
FIG. 9 shows a perspective view of an optical antenna with a silicon waveguide in a further configuration according to embodiments of the disclosure.

FIGS. 8 and 9 depict further implementations of optical antenna 124, in which input waveguide 126 have a variety of directional orientations relative to optical antenna 124 and protrusions 120a, 120b. In the example of FIG. 8, input waveguide 126 may have the same horizontal orientation (e.g., the Y-axis direction) as the width of semiconductor waveguide 114 between first plurality of grating protrusions 120a and second plurality of grating protrusions 120b. In the example of FIG. 9, input waveguide 126 may extend horizontally perpendicularly (e.g., in the X-axis direction) relative to the width of semiconductor waveguide 114 between first plurality of grating protrusions 120a and second plurality of grating protrusions 120b. In such implementations, input signals $R_I$ may travel horizontally through input waveguide 126 before entering optical antenna 124 through semiconductor waveguide 114. In cases where nitride cap 106 includes, or is coupled to, nitride waveguide 128 (FIG. 7), nitride waveguide 128 similarly may have a variety of directional orientations in the X-Y plane. Furthermore, input waveguide 126 may extend horizontally beyond optical antenna 124, thus allowing optical coupling from input waveguide 126 to multiple optical antennae 124 as discussed elsewhere herein.

In the example configurations of FIGS. 7 and 8, semiconductor layer 102 may be structurally distinct from, and located beneath, input waveguide 126. In this case, input waveguide 126 may be formed within, and/or may include a portion of, a layered semiconductor-insulator-semiconductor substrate in place of a bulk semiconductor substrate. In this case, input waveguide 126 may be a semiconductor-on-insulator (SOI) layer on a buried insulator layer 130. Buried insulator layer 130, in turn may be on semiconductor layer 102. Buried insulator layer 130 may include any currently-known or later developed substance for providing electrical insulation, and as examples may include: silicon nitride ($Si_3N_4$), silicon oxide ($SiO_2$), fluorinated $SiO_2$ (FSG), hydrogenated silicon oxycarbide (SiCOH), porous SiCOH, boro-phospho-silicate glass (BPSG), silsesquioxanes, carbon (C) doped oxides (i.e., organosilicates) that include atoms of silicon (Si), carbon (C), oxygen (O), and/or hydrogen (H), thermosetting polyarylene ethers, a spin-on silicon-carbon containing polymer material, near frictionless carbon (NFC), or layers thereof. In some cases, dielectric layer 122 (FIGS. 3, 5, 6) and buried insulator layer 130 may have the same composition or similar compositions.

Figure 10:
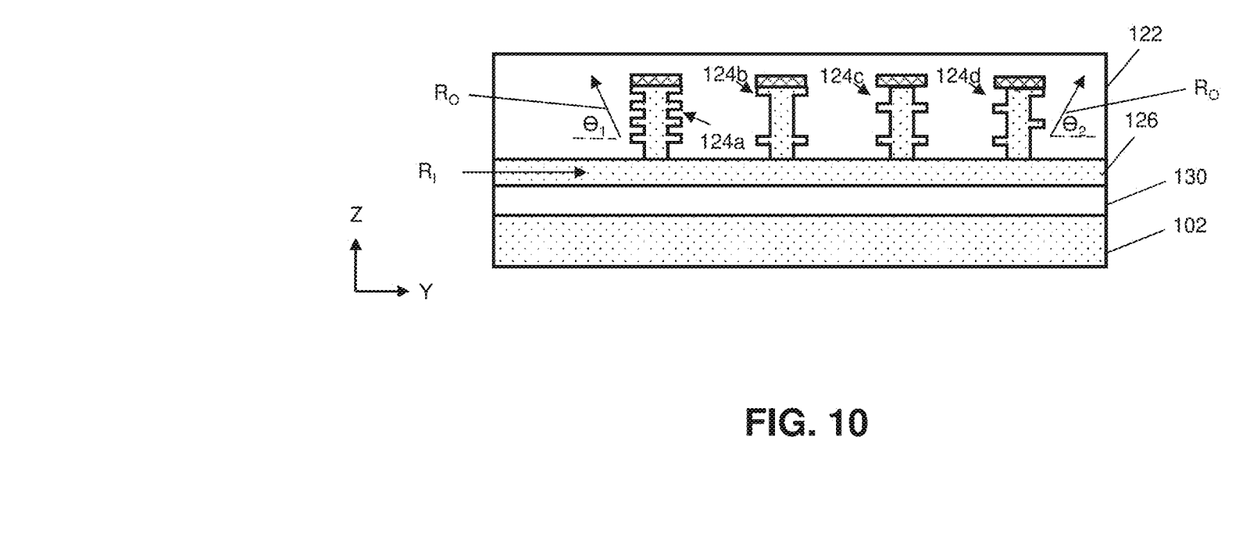
FIG. 10 shows a cross-sectional view of multiple optical antennae on an input waveguide according to embodiments of the disclosure.

FIG. 10 depicts a portion of a PIC structure 132, in which input waveguide 126 is coupled to several optical antennae 124a, 124b, 124c, 124d. Although several optical antennae 124 of PIC structure 132 may have the same or similar structure by including grating protrusions 120 (FIGS. 3-9) of similar size, shape, pitch, etc., this is not necessarily required in all implementations. For example, one input waveguide 126 may be above semiconductor layer 102 and buried insulator layer 130, or in some cases may be on and/or part of a bulk semiconductor substrate. Input waveguide 126 can horizontally transmit input signal(s) $R_I$ to several optical antennae 124a 124b, 124c, 124d, each of which may be within dielectric layer 122 and on a portion of input waveguide 126. One or more of optical antennae 124a, 124, 124c, 124d may include a distinct shape and/or arrangement of grating protrusions 120, thereby varying the directing of output signals $R_O$ from one optical antenna 124 to another. Thus, any of the various optical antenna 124 structures described herein may be used together or separately to control the directing of optical signals from PIC structure 132.

Embodiments of the disclosure provide several technical and commercial advantages, examples of which are discussed herein. Optical antennae 124, when integrated into PIC structure 132, offer a substantially expanded vertical field of view that is suitable for photonic phased arrays, LiDAR applications, and/or other types of PICs. By including two pluralities of horizontally-extending grating protrusions (i.e., first and second pluralities of grating protrusions 120a, 120b, discussed herein), embodiments of the disclosure, optical antenna(e) 124 may be fabricated to suit a variety of applications. Angles $\theta_1$, $\theta_2$, for example, can be individually adjusted by changing the number of grating protrusions, their spacing relative to adjacent protrusions, etc., during manufacture. These and other properties of optical antenna 124 can enable vertical coupling of various waveguide(s) (e.g., input waveguide 126 and/or nitride waveguide 128 (FIG. 7)), while allowing for integration into standard silicon photonics processing.

The terminology used herein is for the purpose of describing particular embodiments only and is not intended to be limiting of the disclosure. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Approximating language, as used herein throughout the specification and claims, may be applied to modify any quantitative representation that could permissibly vary without resulting in a change in the basic function to which it is related. Accordingly, a value modified by a term or terms, such as "about," "approximately," and "substantially," are not to be limited to the precise value specified. In at least some instances, the approximating language may correspond to the precision of an instrument for measuring the value. Here and throughout the specification and claims, range limitations may be combined and/or interchanged, such ranges are identified and include all the sub-ranges contained therein unless context or language indicates otherwise. "Approximately" as applied to a particular value of a range applies to both values, and unless otherwise dependent on the precision of the instrument measuring the value, may indicate +/−10% of the stated value(s).

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiments were chosen and described in order to best explain the principles of the disclosure and the practical application, and to enable others of ordinary skill in the art to understand the disclosure for various embodiments with various modifications as are suited to the particular use contemplated.

What is claimed is:

1. An optical antenna for a photonic integrated circuit (PIC), the optical antenna comprising:
   a semiconductor waveguide on a semiconductor layer, the semiconductor waveguide including a first vertical sidewall over the semiconductor layer;
   a nitride material on an upper surface of the semiconductor waveguide; and
   a first plurality of grating protrusions extending horizontally from the first vertical sidewall of the semiconductor waveguide.

2. The optical antenna of claim 1, wherein the semiconductor layer comprises a portion of an input waveguide below the semiconductor waveguide.

3. The optical antenna of claim 1, wherein the nitride material includes one of a nitride cap or a nitride waveguide.

4. The optical antenna of claim 1, wherein a material composition of the semiconductor waveguide is different from the first plurality of grating protrusions.

5. The optical antenna of claim 1, further comprising a second plurality of grating protrusions extending horizontally from a second vertical sidewall of the semiconductor waveguide, wherein the first plurality of grating protrusions and the second plurality of grating protrusions are arranged symmetrically with respect to a centerline axis of the semiconductor waveguide, and wherein adjacent protrusions in the first plurality of grating protrusions and the second plurality of grating protrusions have a substantially equidistant spacing.

6. The optical antenna of claim 1, further comprising a second plurality of grating protrusions extending horizontally from a second vertical sidewall of the semiconductor waveguide, wherein the first plurality of grating protrusions and the second plurality of grating protrusions are arranged asymmetrically with respect to a centerline axis of the semiconductor waveguide.

7. The optical antenna of claim 1, further comprising a second plurality of grating protrusions extending horizontally from a second vertical sidewall of the semiconductor waveguide, wherein adjacent protrusions in the first plurality of grating protrusions and the second plurality of grating protrusions have a substantially non-equidistant spacing.

8. An optical antenna for a photonic integrated circuit (PIC), the optical antenna comprising:
- a semiconductor waveguide on a semiconductor layer, the semiconductor waveguide including a first vertical sidewall over the semiconductor layer and a second vertical sidewall over the semiconductor layer, opposite the first vertical sidewall;
- a first plurality of grating protrusions extending horizontally from the first vertical sidewall of the semiconductor waveguide;
- a second plurality of grating protrusions extending horizontally from the second vertical sidewall of the semiconductor waveguide;
- a dielectric layer horizontally adjacent the semiconductor waveguide, wherein portions of the dielectric layer interdigitate with the first plurality of grating protrusions and the second plurality of grating protrusions; and
- a nitride waveguide over an upper surface of the semiconductor waveguide and an upper surface of the dielectric layer.

9. The optical antenna of claim 8, wherein the semiconductor layer comprises a portion of an input waveguide below the semiconductor waveguide.

10. The optical antenna of claim 8, wherein a material composition of the semiconductor waveguide is different from the first plurality of grating protrusions and the second plurality of grating protrusions.

11. The optical antenna of claim 8, wherein the semiconductor waveguide includes:
- a base portion on the semiconductor layer below the first plurality of grating protrusions and the second plurality of grating protrusions, and has a vertical thickness of at least approximately six hundred angstroms (Å); and
- an antenna portion over the base portion and horizontally between the first plurality of grating protrusions and the second plurality of grating protrusions.

12. The optical antenna of claim 8, wherein the first plurality of grating protrusions and the second plurality of grating protrusions are arranged symmetrically with respect to a centerline axis of the semiconductor waveguide, and wherein adjacent protrusions in the first plurality of grating protrusions and the second plurality of grating protrusions have a substantially equidistant spacing.

13. The optical antenna of claim 8, wherein the first plurality of grating protrusions and the second plurality of grating protrusions are arranged asymmetrically with respect to a centerline axis of the semiconductor waveguide.

14. The optical antenna of claim 13, wherein adjacent protrusions in the first plurality of grating protrusions and the second plurality of grating protrusions have a substantially non-equidistant spacing.

15. A method of forming an optical antenna, the method comprising:
- forming a semiconductor waveguide over a semiconductor layer;
- forming a nitride material over the semiconductor waveguide; and
- forming a first plurality of grating protrusions on a first vertical sidewall of the semiconductor waveguide.

16. The method of claim 15, further comprising forming an oxide horizontally adjacent the semiconductor waveguide, vertically between adjacent protrusions in the first plurality of grating protrusions.

17. The method of claim 16, wherein forming the semiconductor waveguide includes:
- forming a base portion on the semiconductor layer, the base portion having a vertical thickness of at least approximately six hundred angstroms (Å); and
- forming an antenna portion over the base portion,
- wherein the first plurality of grating protrusions are formed solely on the antenna portion of the semiconductor waveguide.

18. The method of claim 15, wherein the semiconductor layer comprises a portion of an input waveguide below the semiconductor waveguide.

19. The method of claim 15, wherein forming the nitride material includes forming a nitride cap or a nitride waveguide over the semiconductor waveguide.

20. The method of claim 15, further comprising forming a second plurality of grating protrusions on a second vertical sidewall of the semiconductor waveguide, wherein forming the second plurality of grating protrusions causes the first plurality of grating protrusions and the second plurality of grating protrusions to be asymmetric with respect to a centerline axis of the semiconductor waveguide.

\* \* \* \* \*